United States Patent [19]

Shimano

[11] 4,386,472
[45] Jun. 7, 1983

[54] FIXING BAND FOR SHOES

[75] Inventor: Keizo Shimano, Sakai, Japan

[73] Assignee: Shimano Industrial Company Limited, Osaka, Japan

[21] Appl. No.: 301,419

[22] Filed: Sep. 11, 1981

[30] Foreign Application Priority Data

Sep. 19, 1980 [JP] Japan .......................... 55-134342[U]
Sep. 19, 1980 [JP] Japan .......................... 55-134343[U]

[51] Int. Cl.³ ............................................... A43B 5/00
[52] U.S. Cl. ...................................................... 36/131
[58] Field of Search ........................ 36/131, 132, 136

[56] References Cited

U.S. PATENT DOCUMENTS 4,237,628 12/1980 Etancelin ............................. 36/131

FOREIGN PATENT DOCUMENTS 460894 12/1950 Italy ...................................... 36/131

Primary Examiner—Patrick D. Lawson
Attorney, Agent, or Firm—Stevens, Davis, Miller & Mosher

[57] ABSTRACT

A fixing band for fixing a cyclist's shoe onto a pedal of a bicycle, which comprises a band body and a buckle, a shoe binding portion at an intermediate portion of the band body displaced in a circular arc widthwise outwardly of the band body with respect to the straight line connecting a base carrying the buckle and an insertion end to be inserted into the buckle, so that the binding portion is allowed to contact throughout with the outer surface of the shoe's instep.

5 Claims, 8 Drawing Figures

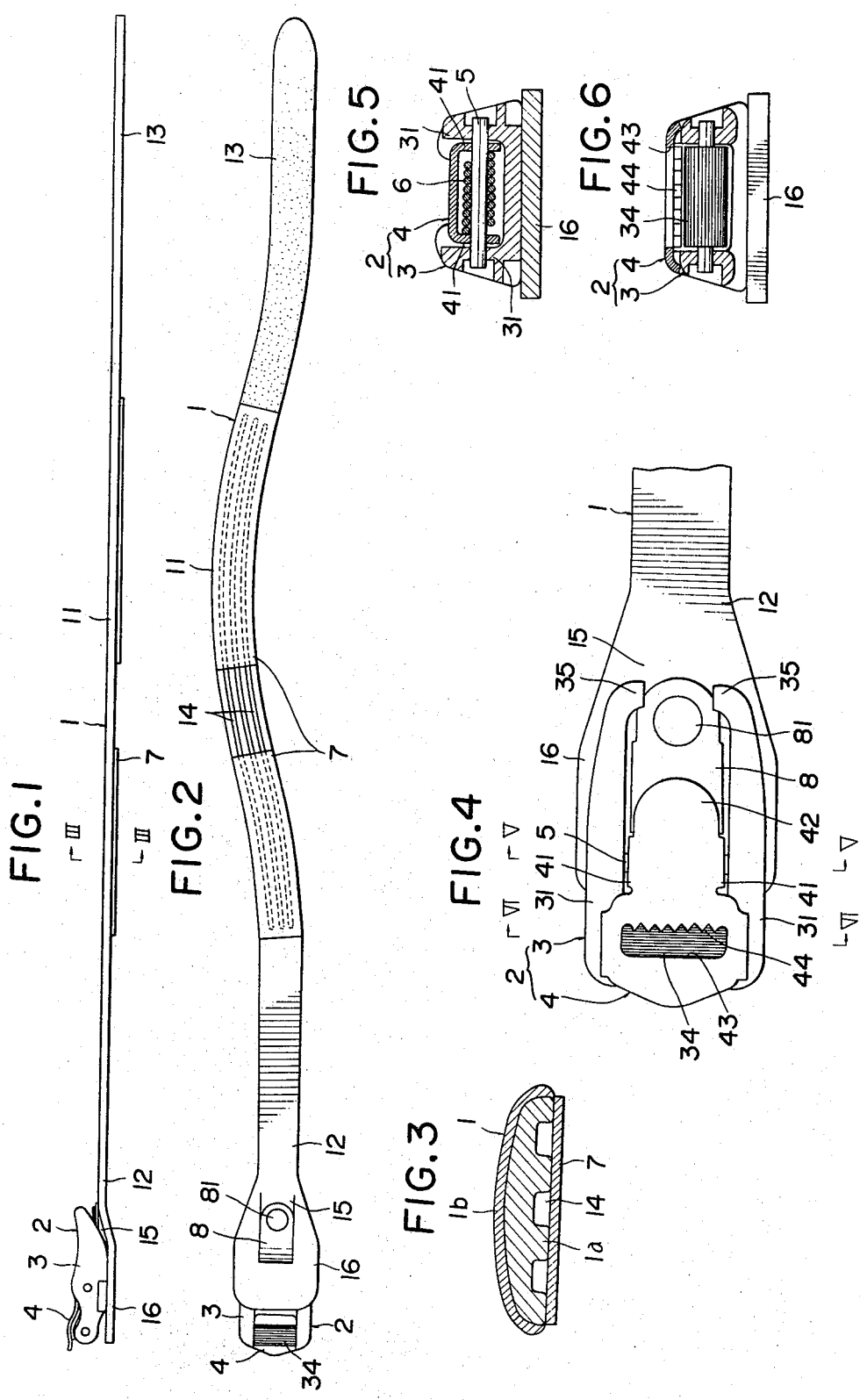

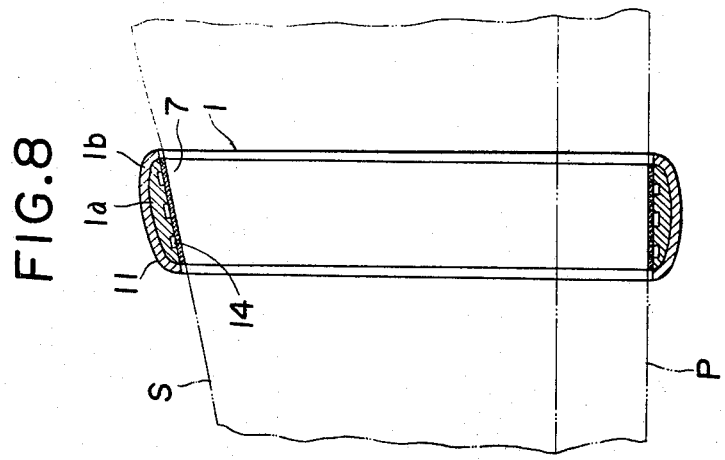
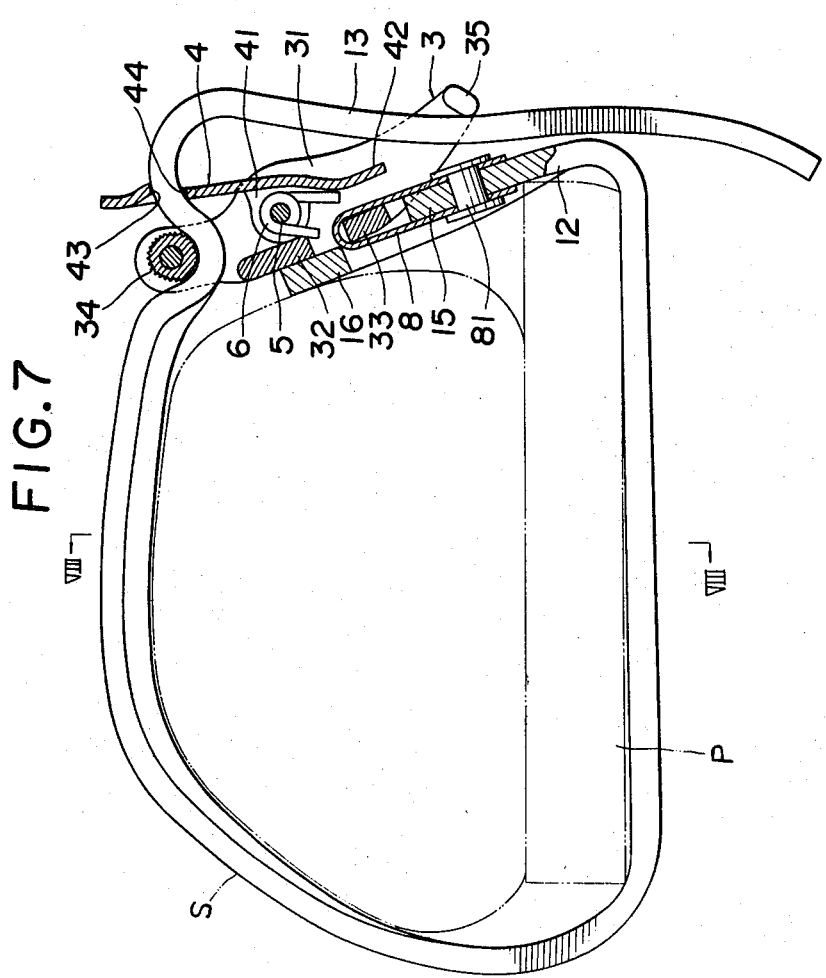

FIXING BAND FOR SHOES

FIELD OF THE INVENTION

This invention relates to a fixing band for fixing a cyclist's shoe to each pedal of a bicycle.

BACKGROUND OF THE INVENTION

Generally, a fixing band comprises a band body of a strip shape and a buckle mounted on the base at one lengthwise end of the band body, and is used for tightening a cyclist's shoe on each pedal of a bicycle.

The band body comprises the base carrying the buckle, an insertion end to be inserted into the buckle, and a shoe binding portion positioned between the base and the insertion end and connecting with the instep of the cyclist's shoe. The buckle is placed at one side of the shoe on the pedal and the band body is wound around the instep of the shoe from below the pedal so that the binding portion abuts against the instep, and the insertion end is inserted into the buckle, pulled to tighten the band body onto the shoe, and retained to the buckle, thereby fixing the shoe on each pedal.

The conventional band has a body, base, binding portion and insertion end, located along a straight-line. On the other hand, the instep of the shoe is sloped downwardly from the ankle side to the toe side so as to be fit to an external form of the cyclist's foot.

Accordingly, the straight band body, when tightened on the shoe, contacts at the edge at the ankle side with the upper portion of the sloped instep so as to raise the edge at the toe side from the surface of the instep. In other words, the binding portion cannot contact throughout with the instep and is apt to slide down along the sloped instep. Hence, a problem is created in that the band body loosens and does not ensure restraint of the shoe onto the pedal. Also, the band body, when contacting only at the edge at the ankle side with the instep, causes the cyclist to feel a severe pain in the instep of his foot. As a result, a cyclist cannot forcibly tighten the band body, so that the binding portion becomes slippery.

SUMMARY OF THE DISCLOSURE

In order to solve the above problem, this invention has been designed. A main object of the invention is to provide a fixing band for the cyclist's shoe on each pedal at the bicycle, which can be tightened to contact at its binding portion throughout with the outer surface of the instep of the shoe, thereby ensuring restraint of the shoe on the pedal without a careless looseness of the band body.

Another object of the invention is to provide a fixing band which, even when its body is strongly tightened, causes the cyclist to feel no pain.

A further object of the invention is to provide a fixing band which can reduce an air resistance against the shoe when fixed onto the pedal.

This invention is characterized in that the band body comprises a base, a shoe binding portion, and an insertion end, the shoe binding portion being displaced in a circular arc widthwise outwardly of the band body with respect to a straight line connecting the base and insertion end, so that the binding portion can contact throughout with the outer surface of the instep of the shoe, thereby solving the above problems by a simple improvement in construction.

Also, this invention is characterized in that the band body is made flat at its inner surface and swollen widthwise convexly at the outer surface, thereby being made streamlined in cross section. Hence, the air resistance against the shoe, as abovementioned, can be reduced while the binding portion contacts throughout with the shoe's instep.

This invention is also characterized in that a plurality of ridges or cushion material are provided at the inner surface of the binding portion in contact with the instep of the shoe.

These and other objects and novel features of the invention will be more apparent from the following description which is provided in conjunction with the accompanying drawings.

BRIEF DESCRIPTION OF THE DRAWINGS

FIG. 1 is a side view of an embodiment of a fixing band of the invention,

FIG. 2 is a bottom view of the FIG. 1 embodiment,

FIG. 3 is an enlarged sectional view taken on the line III—III in FIG. 1,

FIG. 4 is an enlarged plan view of a band body at its mounting portion for a buckle, FIG. 5 is a sectional view taken on the line V—V in FIG. 4, FIG. 6 is a sectional view taken on the line VI—VI in FIG. 4, FIG. 7 is a partially cutaway side view of the FIG. 1 embodiment when in use, and FIG. 8 is a sectional view taken on the line VIII—VIII in FIG. 7.

DETAILED DESCRIPTION OF THE INVENTION

In the drawings, a band body generally designated by reference numeral 1 is formed of a core 1a made from a hard synthetic resin and of a cover 1b made from a transparent soft synthetic resin, is strip-shaped in a given length, and comprises a shoe binding portion 11 to contact with the instep of a cyclist's shoe so as to restrain the shoe onto a pedal, a base 12 in continuation of binding portion 11 at one lengthwise and thereof, and an insertion end in continuation of the same at the other lengthwise end.

A buckle generally designated by reference numeral 2 comprises a buckle body 3 mounted on base 12 of band body 1 and a retainer 4 mounted on buckle body 3 for retaining insertion end 13.

The buckle body 3 comprises a pair of side plates 31, a connecting bar 32 for connecting the plates 31 at a fixed interval, and a retaining bar 33. A roller 34 having a number of indentations extending axially of the roller, is journaled to one lengthwise ends of side plates 31, and at the other lengthwise ends thereof are provided a pair of pushers 35 projecting oppositely to each other for pushing insertion end 13.

The retainer 4 also is formed of a flat metallic plate and has a pair of bearing portions 41 at both sides of a lengthwise intermediate portion of the retainer 4, a push control 42 at one lengthwise end, and an insertion bore 43 at the other lengthwise end, the bore 43 having sawtoothed notches at the push control 42 side.

The buckle body 3 is incorporated with retainer 4 to form buckle 2. The retainer 4, keeping bearing portions 41 between the side plates 31, is pivoted swingably to buckle body 3 through a shaft 5, and a coil spring 6 is wound thereon and engages at one end with buckle body 3 and at the other end with retainer 4, so that the coil spring 6 biases the retainer 4 at the insertion bore 43 side thereof always toward roller 34.

The band body 1, as shown in FIG. 2, has the binding portion 11 curved in a circular arc widthwise outwardly of the body 1 with respect to the straight line connecting the base 12 and insertion end 13.

Also, the band body 1 is this embodiment, as shown in FIG. 3, is flat at the inner surface thereof with respect to a shoe S schematically shown in FIG. 7 and bowed convexly at the outer surface so as to be streamlined in cross section, thereby reducing an air resistance against the outer surface of shoe S when fixed to a pedal P as schematically shown in FIG. 7. At the inner surface of body 1, in turn, of core 1a, are provided a plurality of ridges 14 extending lengthwise of body 1 and the binding portion 11 has at the inner surface thereof cushion members 7, such as sponge. The base 12 is made wide at the outermost end, slits at the central portion in a U-like shape directed longitudinally of the band body 1, and is provided with a mounting portion 15 to connect with retaining bar 33 at buckle 2. A cover 16 is provided to cover the inside of buckle 2 with respect to shoe S, the mounting portion 15 carrying a connector 8 of a U-like shape in section, the connector 8 embracing retaining bar 33 and being fixed thereto through a pin 81, so that buckle 2 is mounted on base 12. In this condition, the cover 16 extends along the inside of buckle 2 to prevent the side plates 31, connecting bar 32 and retaining bar 33, from contacting directly with shoe S.

The fixing band is used to fix shoe S to pedal P in such a manner that the buckle 2, as shown in FIG. 7, is placed at one side of shoe S, and the band body 1 is wound from its insertion end 13 through and below pedal P, so that the binding portion 11 is contacted with the instep of shoe S and the insertion end 13 is inserted into band insertion bore 43 through between the connecting bar 32 and the roller 34. At this time, the control 42 at retainer 4 is pushed to swing retainer 4 clockwise against spring 6, thereby facilitating the aforesaid insertion of insertion end 13 into bore 43.

Next, upon releasing the control 42, the retainer 4 is restored by the spring force of spring 6 and the sawtoothed notches 44 press the insertion end 13 onto roller 34 to thereby retain the insertion end 13 between the notches 44 and the roller 34, in which the insertion end 13 can be further pulled to tighten the band body 1 onto shoe S, thus ensuring restraint of shoe S by binding portion 11.

When the insertion end 13 is released after being pulled, the notches 44 encroach on insertion end 13, thereby keeping it retained between the notches 44 and the roller 34.

The binding portion 11, when the band body 1 tightens shoe S, never rises at the toe side edge from the instep of shoe S even where it slopes downwardly toward the toe side due to the fact that the binding portion 11 curves widthwise outwardly with respect to the straight line connecting the base 12 and insertion end 13 so that the band body 1, when tightening shoe S, is smaller at the toe side edge in a whole length than the ankle side edge.

The insertion end 13, after being retained as described above, is inserted under and between the pushers 35 to thereby further ensure the retainment of insertion end 13 and prevent it from leaping up from the base 12.

Furthermore, in this embodiment, the ridges 14 at the inner surface of binding portion 11 further ensure prevention of a slide down of binding portion 11 toward the shoe's toe. Also, the cushion materials 7 at the same surface, even when the band body 1 is strongly tightened, allows the cyclist to feel no pain in the instep of his foot.

The cover 16 at base 12 also prevents buckle 2 from contacting directly with the cyclist's foot, thereby enabling protection thereof.

When the band body 1 is formed of synthetic resin, teeth-marks by notches 44 remain on the inner surface of insertion end 13, which can be remedied by having the inner surface of insertion end 13 previously scratchbrush finished so as to keep the teeth-marks from sight.

Alternatively, the band body 1 may be formed of leather or a composite of synthetic resin and leather.

As seen from the above, the fixing band for the cyclist's shoe of the invention has binding portion 11 at band body 1 displaced widthwise outwardly in a circular arc with respect to the straight line connecting the base 12 and insertion end 13, so that the toe side edge of body 1 is made larger in length than the ankle side edge thereof when the body 1 is tightened on shoe S, whereby the binding portion 11 contacts throughout with the instep of shoe S and does not rise therefrom at its edge at the toe side although the instep slopes downwardly from the ankle side toward the toe side.

Hence, the band body 1 reliably tightens shoe S onto pedal P and the cyclist feels no pain in his instep even when the body 1 is strongly tightened. The complete contact of binding portion 11 with the shoe's instep can avoid its slide down therefrom.

Also, the plurality of ridges 14 provided at the inner surface, in turn the surface to contact with the instep, at binding portion 11 and extending lengthwise thereof, can further reliably prevent the binding portion 11 from sliding down toward the toe side.

Furthermore, the band body 1 flat at the inner surface and streamlined in cross section at the outer surface causes less disturbance in an air flow surrounding the band body 1, thereby reducing an air resistance against the whole surface of shoe S.

While a preferred embodiment of the invention has been described using specific terms, such description is for illustrative purpose only, and it is to be understood that changes and variations may be made without departing from the spirit or scope of the invention which is defined by the following claims.

What is claimed is:

1. A fixing band for fixing a cyclist's shoe to a pedal of a bicycle, said band comprising:
    a band body of a strip-shape, and
    a buckle having a retaining means for receiving therein and retaining therewith said band body,
said band body having a base on which said buckle is mounted, an insertion portion inserted into said buckle and retained by said retaining means, and a shoe binding portion positioned at an intermediate portion between said base and said insertion for contacting with the outer surface of an instep of said shoe to restrain said shoe with respect to said pedal, said binding portion, when said band is in a longitudinally extended state, being displaced in a circular arc widthwise outwardly of said body with respect to the straight line connecting said base and insertion portion.

2. A fixing band for fixing a cyclist's shoe according to claim 1, wherein said band body has an inner surface with respect to said shoe and an outer surface with respect to said shoe, said inner surface being flat, said outer surface being swollen outwardly to be formed in a streamlined shape.

3. A fixing band for fixing a cyclist's shoe according to claim 1, wherein at the inner surface of said shoe binding portion at a side in contact with said shoe's instep are provided a plurality of ridges extending along and lengthwise of said band body.

4. A fixing band for fixing a cyclist's shoe according to claim 2 or 3, wherein at the inner surface of said shoe binding portion at a side in contact with said shoe's instep are provided cushion members comprising an elastic material.

5. A fixing band for fixing a cyclist's shoe according to claim 1, wherein the base of said band body is made larger in width and has a mounting portion which connects with said buckle and a cover portion for covering said buckle at the inside thereof with respect to said shoe.

* * * * *